United States Patent [19]

Francioni

[11] Patent Number: 4,755,093
[45] Date of Patent: Jul. 5, 1988

[54] DEVICE FOR DIVIDING FLAT PRODUCTS, SUCH AS COOKIES AND THE LIKE, INTO GROUPS FOR PACKAGING

[75] Inventor: Renzo Francioni, Prato Sesia, Italy

[73] Assignee: Cavanna S.p.A., Prato Sesia, Italy

[21] Appl. No.: 939,727

[22] Filed: Dec. 9, 1986

[51] Int. Cl.⁴ .................. B65G 57/30; B65G 59/06
[52] U.S. Cl. .......................... 414/32; 53/541; 414/43; 414/93; 414/104; 414/106; 414/114; 414/131
[58] Field of Search .............. 414/32, 43, 46, 49, 414/92, 93, 114, 131, 104, 106, 107; 271/212; 53/541

[56] References Cited

U.S. PATENT DOCUMENTS

| | | | |
|---|---|---|---|
| 1,397,552 | 11/1921 | Smith | 414/107 X |
| 2,576,366 | 11/1951 | Smith | 414/131 X |
| 3,228,538 | 1/1966 | Coates | 414/114 X |
| 3,675,792 | 7/1972 | Griner et al. | 414/107 X |
| 4,125,253 | 11/1978 | Wangermann | 414/106 X |
| 4,364,467 | 12/1982 | Blakelock | 198/409 X |
| 4,417,837 | 11/1983 | Pinto et al. | 414/104 |

*Primary Examiner*—Leslie J. Paperner
*Attorney, Agent, or Firm*—Birch, Stewart, Kolasch & Birch

[57] ABSTRACT

A device which is effective to divide flat cookies into groups of cookies for packaging at a high rate of speed without damaging the cookies which comprises a vertical receiving magazine and a substantially vertical collecting magazine the former being open at the bottom to associate with a rest surface for supporting the cookies, and the latter being open at the bottom to receive cookies from a sawtooth wheel rotating about a horizontal axis; and a pusher is provided for shifting a cookie from the rest surface to the wheel said wheel feeding the collecting magazine from below.

6 Claims, 6 Drawing Sheets

DEVICE FOR DIVIDING FLAT PRODUCTS, SUCH AS COOKIES AND THE LIKE, INTO GROUPS FOR PACKAGING

BACKGROUND AND SUMMARY OF THE INVENTION

The present invention relates to a device for dividing flat pastry products, such as cookies and the like, into groups for packaging.

As is known in the pastry product industry, cookies are delivered from baking ovens, or some other item of equipment operative to either provide them with a coating or stuffing or else, virtually on a continuous basis. Accordingly, the oncoming cookies require to be divided into groups, e.g. into groups comprising a given number of cookies, laid on the flat close against each other, preparatory for delivery to a machine operative to package the individual groups.

Such division has been accomplished heretofore by acting on the cookies, laid in a continuous row within a cookie delivery trough, by means of a set of baffle plates arranged to act on the row alternately, in the manner of an escapement mechanism.

That arrangement is primarily disadvantageous in that, each time that the dividing baffle plates are operated, the row of oncoming cookie is suddenly stopped, which is obviously detrimental to the cookie integrity. A further disadvantage is that with thin cookies, and concurrently with thickness dimensions having close values to the extremes of the tolerance range, cookies may suffer damage by any of said baffle plates.

The problem underlying this invention is to provide a device as indicated, which has such constructional and operational features as to overcome the cited disadvantages affecting prior devices.

The solution provided by the present invention is that of forming a group of cookies within a substantially vertical magazine being fed from underneath by a sawtooth wheel which is fed, in turn, in a horizontal direction tangent thereto.

Based on this solutive idea, and to solve the aforesaid technical problem, this invention provides a device as specified above, which is characterized in that it comprises a sawtooth wheel wherein each tooth has a back face and a front face, which wheel is rotatable with the back faces first about a horizontal axis, a rest surface extending tangentially to said wheel at the tips and roots of its teeth, a tubular cookie-receiving magazine extending vertically above the rest surface and open thereto, a pusher acting on said rest surface toward the teeth, a tubular cookie-collecting magazine extending in a substantially vertical direction radially to said wheel, being open thereto and fed by said wheel, stop means for holding the cookies back at the collecting magazine, and a lifting finger engaged movingly across said collecting magazine to move a group of cookies away from the wheel.

BRIEF DESCRIPTION OF THE DRAWINGS

Further features and the advantages of the device according to the present invention will become apparent from the following description of a preferred embodiment thereof, given by way of illustration and not of limitation with reference to the accompanying drawings, where.

DETAILED DESCRIPTION OF THE INVENTION

Figure 1:
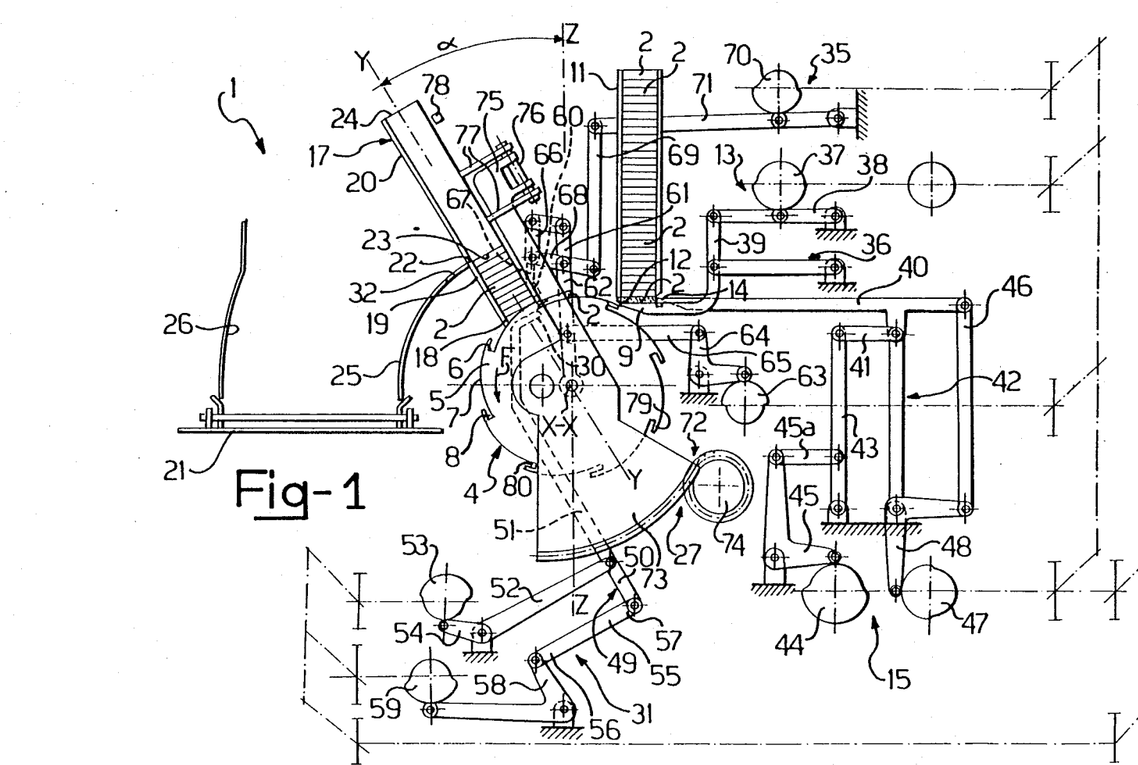
FIG. 1 is an elevation view showing schematically a device according to this invention.
Figures 2, 3:
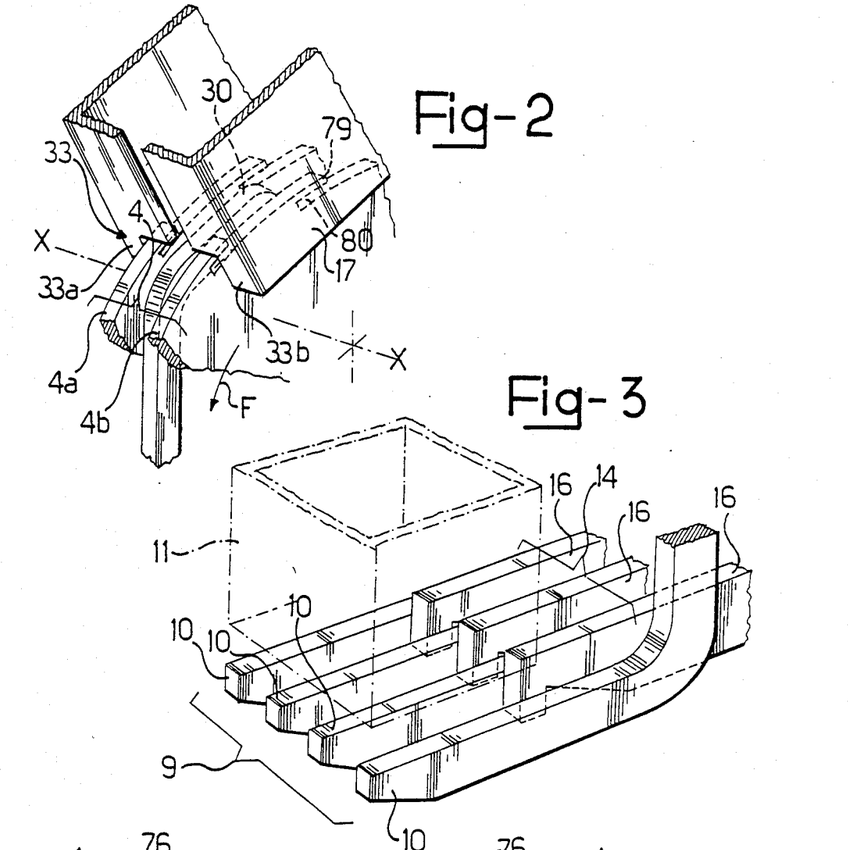
FIG. 2 is a perspective view showing schematically a detail of the device of FIG. 1.
FIG. 3 is a perspective view showing schematically another detail of the device of FIG. 1.
Figure 4:
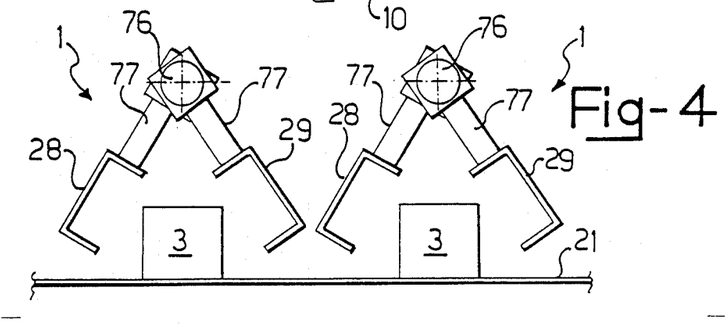
FIG. 4 is a perspective view showing schematically yet another detail of the device of FIG. 1, and FIGS. 5 to 12 show schematically and to a reduced scale the device of FIG. 1 at successive stages of its operation.
Figure 5:
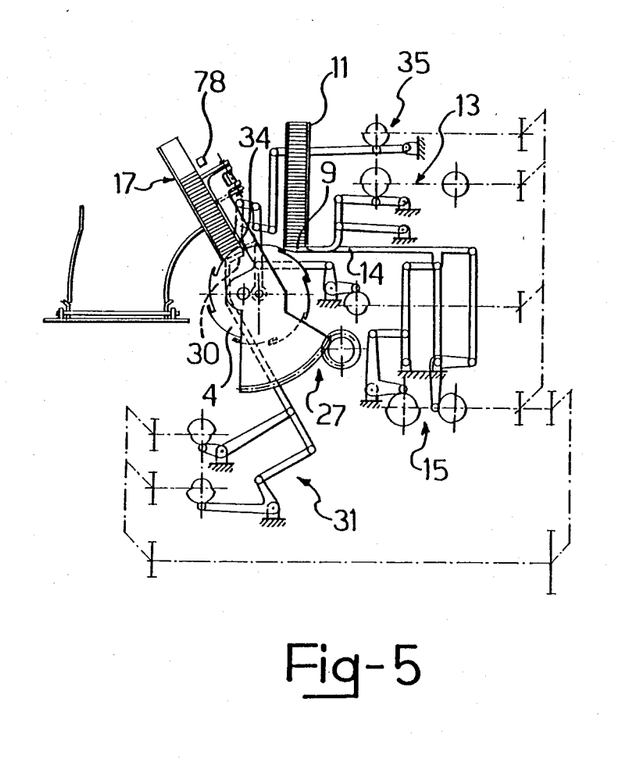
Figure 6:
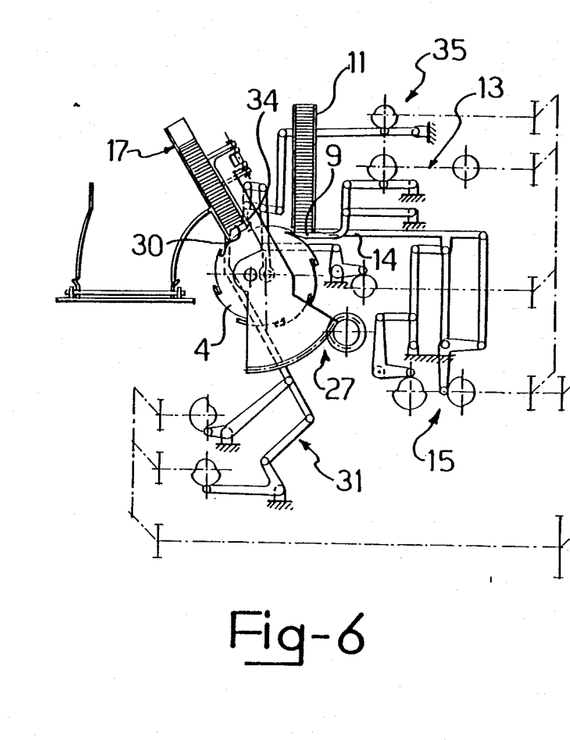
Figure 7:
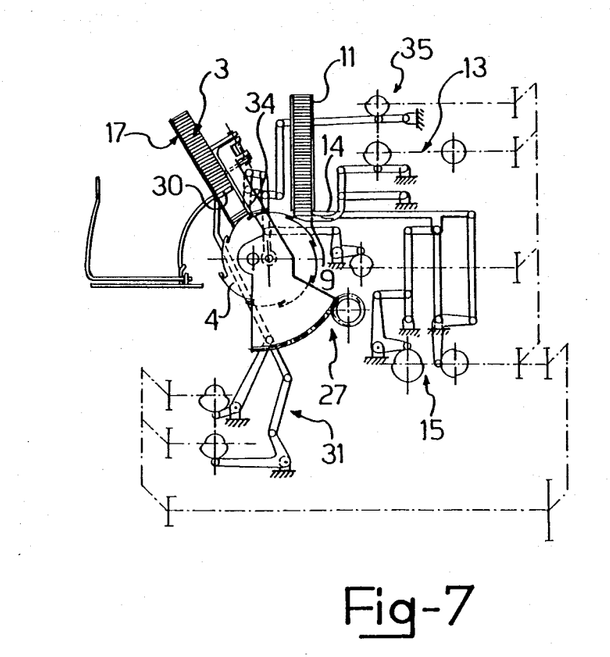
Figure 8:
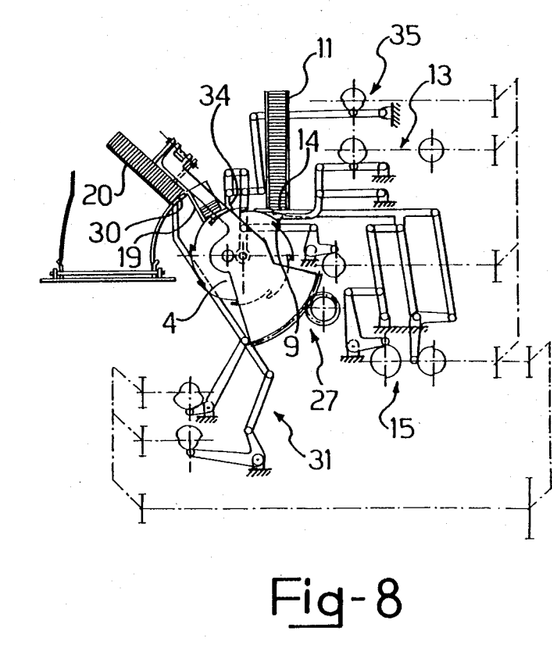
Figure 9:
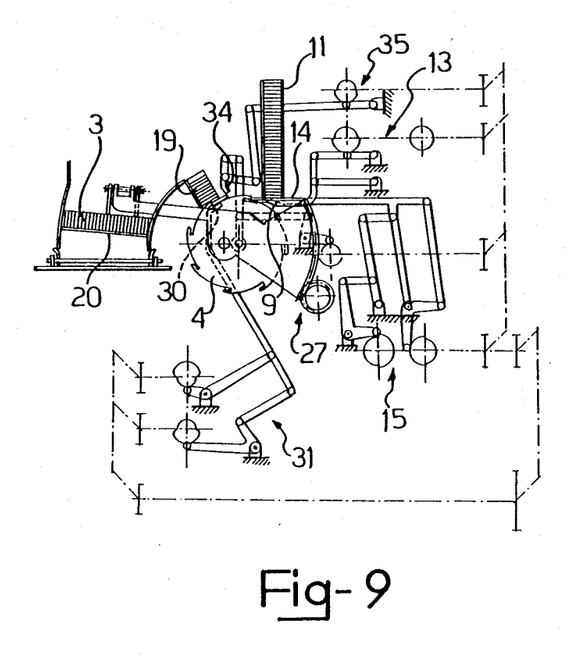
Figure 10:
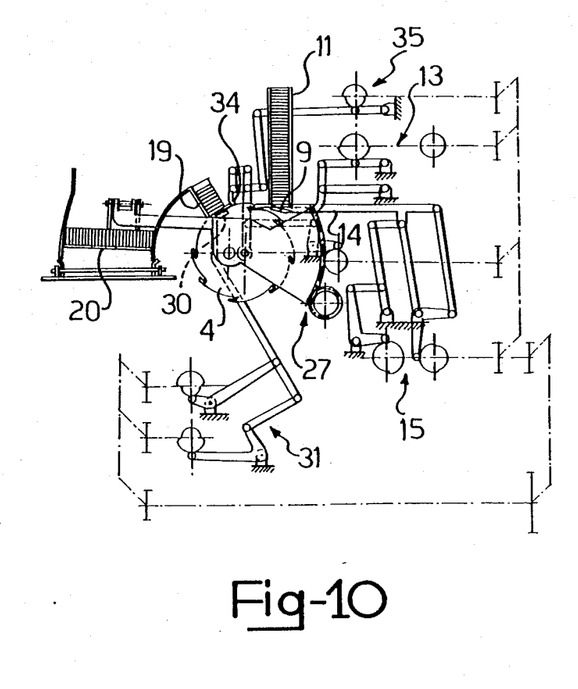
Figure 11:
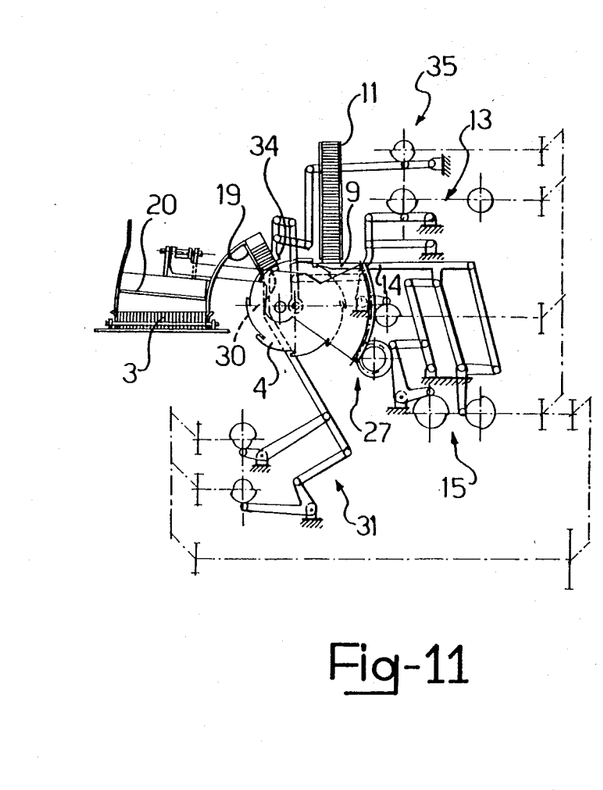
Figure 12:
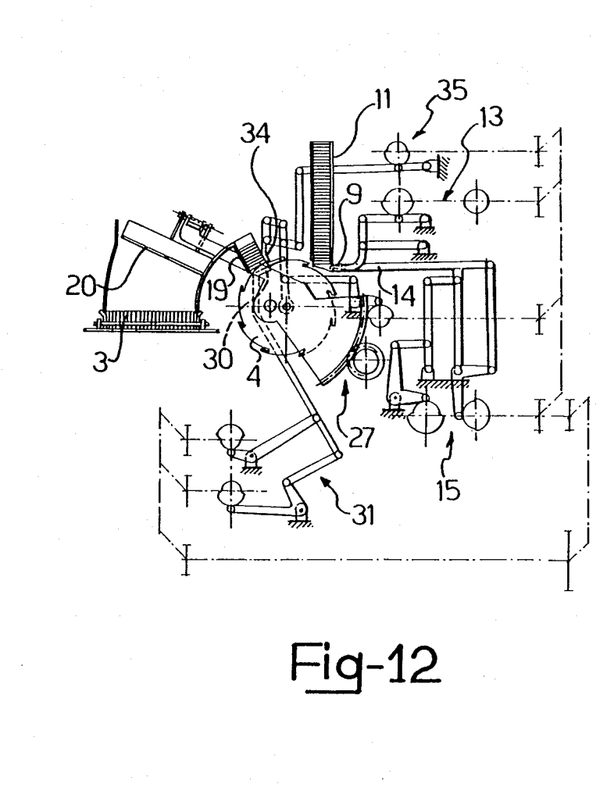

With reference to the accompanying drawing figures, numeral 1 designates generally a device for dividing flat pastry products 2, such as cookies, into groups 3 for packaging.

The device 1 comprises, within a load-bearing frame which is quite conventional in design and not shown in the drawing for clarity, a sawtooth wheel 4. The wheel 4 is journalled to the frame about a horizontal axis X—X of rotation, it being driven rotatively and continuously by a means, not shown, in the direction of the arrow F.

The wheel 4 is formed, around its periphery, with a plurality of sawteeth 5. Each sawtooth 5 has a substantially radial front face, and an arcuate ramp-like back face 7. Between the front face of each tooth and the back face of its adjoining tooth, there is defined a space indicated at 8.

It should be noted that each sawtooth 5 is provided with a rigid eave 79 which extends in continuation of its back face 7, in a substantially parallel direction to the back face 7 of an adjoining sawtooth 5, cantilever-fashion over said adjoining tooth.

Said eave 79 defines, at a portion of the space 8 between two teeth, a housing 80 which is bordered at the top and protected by the eave itself.

It should be noted that the wheel 4 is formed of two laminar disks being the like of each other and in mutually spaced apart relationship, as indicated at 4a and 4b, respectively.

The device 1 further comprises a horizontal rest surface 9 which extends tangentially of the wheel 4 at the top thereof, on the downstream side of its teeth 5.

It should be noted that surface 9 is formed of a plurality of laminar strips, comprehensively designated 10, which are all alike and placed at a pitch distance apart. Said surface 9 is supported on the frame in a vertically movable manner under the action of a drive means, as explained hereinafter.

Indicated at 11 is a tubular magazine for dispensing oncoming cookies 2, which is attached to the device frame. Said magazine 11 extends vertically above the rest surface 9, and has its bottom end 12 open thereto. Thus, the rest surface 9 constitutes the bottom of that magazine.

Said rest surface 9 is shiftable vertically under the action of a drive means 13 between a first, lowered position where it is located at a preset distance away from the end 12 equal to at least a cookie thickness, and a second, raised position where it is in substantial contact with the end 12.

Indicated at 14 is a pusher acting on said rest surface 9. The pusher 14 is alternately movable in a substantially horizontal direction toward and away from the top of the wheel 4, tangentially thereto. In particular, it will perform, under the action of a drive means 15, a reciprocating movement toward and away from the top of the wheel 4.

It should be noted that that pusher 14 is formed of a plurality identical laminar strips, comprehensively designated 16, which are in pitched, mutually spaced-apart relationship and interleaved comb-like to the strips 10 that form the rest surface 9.

The device 1 also comprises a cookie-collecting tubular magazine, indicated at 17. The magazine 17 extends in a substantially vertical direction radially of the wheel 4, and is open thereto at the bottom. In particular, it has its bottom end 18 arranged to face the periphery of the wheel 4.

In the example shown, the magazine 17 extends along a direction Y—Y which forms an angle α of about 30° with the vertical Z—Z.

The magazine 17 is formed of a first, or initial, portion located on the wheel side, which is indicated at 19 and attached to the frame, and a second, or terminating, portion, which is indicated at 20 and mounted to the frame in an angularly shiftable manner about the axis X—X between a first position, where it is aligned to the first portion 19 to form the magazine 17, and a second position whereat it is tilted horizontally above a conveyor belt 21, known per se, which is operative to take the groups 3 made available from the device 1 away to a suitable machine for their packaging.

The remote end of the initial portion 19 from the end 18 is indicated at 22. The bottom end of the terminating portion 20, which faces the end 22 with the portion 20 aligned to the portion 19, is indicated at 23. The numeral 24 designates the free end of the terminating portion 20.

Indicated at 25 and 26 are arcuate guides according to arcs of a circle centered on the axis X—X, which extend along the paths followed by the ends 24 and 23 of the terminating portion 20 during its angular movement.

Indicated at 27 is a drive means for driving said terminating portion 20 angularly.

Advantageously, the terminating portion 20 is formed of two shells 28 and 29 which can be opened clamshell-like over the conveyor belt 21.

The device 1 of the present invention further comprises a lifting finger 30, which is supported on the frame in a movable manner along a substantially rectangular path under the action of a drive means 31. In particular, the path of the lifting finger 30 comprises a working section which extends in the direction Y—Y within the collecting magazine 17, and along which the lifting finger 30 will be in engagement across the collecting magazine 17 itself. More specifically, the working section extends from a first, lower working position where the lifting finger 30 is located below the end 18 of the magazine 17, placed between the disks 4a and 4b which form the wheel 4, and a second, upper position of the work end, where the lifting finger is located directly against the lower end 23 of the terminating portion 20 of the collecting magazine 17.

The path of the lifting finger also comprises an exiting section away from said second position, a return section, and an entrance section to its first position.

A slot 32 formed in the guide 25 is intended to accommodate the finger 30 while in its take-away exiting section.

Generally indicated at 33 are stop means acting in a tangent direction to the wheel 4 for holding a cookie 2 at the bottom end 18 of the collecting magazine 17, which is open, as mentioned, to the wheel 4. It should be noted that such stop means consists of two lugs 33a and 33b projecting from the first receiving portion 19 of the collecting magazine 17 in continuation thereof along a radial direction toward the axis X—X, externally of the disks 4a and 4b.

The device 1 advantageously comprises a paddle 34 which is supported on the frame between the receiving magazine 11 and the collecting magazine 17 in a movable manner along a substantially rectangular path, under the action of a drive means 35.

In particular, said path includes a working section extending in a substantially perpendicular direction to the direction Y—Y between a first position of work commencement where the paddle is at a preset distance from the collecting magazine, and a position of work end where it is close against the collecting magazine between its bottom end 18 and the back face 7 of a tooth 5 of the wheel.

The path of the paddle 34 also includes an exiting section of removal from said position of work end, a return section of return movement in the opposite direction to the working section, and an entrance section of movement toward the position of work commencement.

As for the drive means 13, 15, 31 and 35, provided in the device 1 for driving the rest surface 9, pusher 14, lifting finger 30, and paddle 34, respectively, these are advantageously of the cam and linkage rod type.

In particular, the drive means 13 comprise an articulated parallelogram 36, which is driven by a cam 37 acting on a rocker arm 38 thereof, its movable side 39 carrying the rest surface 9.

The drive means 15 comprises a rod 40 which carries the pusher 14 on one end.

The rod 40 is pivoted at an intermediate point to a movable side 41 of an articulated parallelogram 42, a rocker arm 43 whereof is subjected to the action of a cam 44 through a crank lever 45 and related small connecting rod 45a. The opposed end of the rod 40 is subjected to the action of a link 46, in turn driven by a cam 47 via a crank lever 48, the cam 47 being configured to impart the rod 40 with such rotational movements as to hold the pusher at the same level throughout the movement of the articulated parallelogram 42.

The drive means 31 of the lifting finger 30 comprises an articulated quadrilateral 48 the movable side 50 whereof carries the finger 30 at the end of an extension 51 thereof. A rocker arm 52 of the quadrilateral 49 is shiftable angularly under the action of a cam 53 acting on a lug 54 of said rocker arm. The other rocker arm 55 has one end 56, remote from the end 57 pivoted to the movable side, pivoted to the end of a crank lever 58 the other end whereof is subjected to the action of a cam 59.

The drive means 35 for the paddle 34 comprises an articulated parallelogram 60, which has one side 61 pivoted, at the end of an extension 62 thereof, about the axis X—X and shiftable angularly under the action of a cam 63 via a crank lever 64 and its related small connecting rod 65. An opposed side 66 carries the paddle 34 at the end of an extension 67 thereof. A rocker arm 68 of the parallelogram is subjected to the action of a long link 69, in turn subjected to the action of a cam 70 via a lay arm 71. As for the drive means 27 for the terminating portion 20 of the collecting magazine, this comprises a mechanism 72 having a gear segment 73 which carries said terminating section 20 and is mesh engaged by a pinion gear 74. More specifically, the gear segment 73 has a lug 75 which carries a pin 76 whereto there are journalled, through arms 77, the two clamshell-opening shells 28 and 29 that form said magazine terminating section.

It should be noted that all the cams are interconnected drivingly together in a suitable manner to provide synchronized movement of the movable members, as required.

It should be also noted that a detector, indicated at 78, is positioned along the collecting magazine 17. The device 1 is completed with a stroke counter effective to count the strokes of the pusher 14.

In addition, the device just described is advantageously associated in a cluster with a plurality of like devices 1 arranged in side-by-side relationship and being distributed along the conveyor belt 21.

The operation of the device 1 according to the invention will be described herein below with reference to a starting condition in which a plurality of cookies 2 are stacked in the magazine 11 onto the rest surface 9, as positioned in its lowered position, and a plurality of cookies 2 are being stacked in the collecting magazine 17 while bearing on the disks 4a and 4b of the turning wheel 4.

The pusher 14, in its movement along a tangent direction to the wheel 4, will shift cyclically, in timed relationship with the passing of the wheel teeth 5, so that cookie 2 bears directly on the rest surface 9 in the space 8 between consecutive teeth. With the cookie 2 in the space 8, a part of it will occupy the housing 80 and be protected by the eave 79. The pusher 14 disposes the cookie 2 to bear against the back face 7 of that tooth which is located downstream of the space 8, and contact the front face 6 of the upstream tooth.

As the back face 7 of that same tooth and the eave 79 thereof lift the cookies 2 contained in the collecting magazine 17 to make room for the next cookie 2, the paddle 34 will travel through the entrance section of its path and the working one, urging the cookie 2 toward the interior of the magazine 17, underneath the cookies contained therein, until the cookie 2 reaches the stop means 33. The paddle will then travel through the exiting section and return section to resume its original position.

All this is repeated, through a number of successive cycles, until the stroke counter signifies that a preset number of cookies have been fed to the wheel. At this point, the rest surface 9 will move up, advantageously with the pusher 14 extended toward the wheel, to inhibit descent of the cookies 2 within the receiving magazine. With a set delay time, which is selected to enable the last of the cookies fed to the wheel to also reach the collecting magazine, and hence, the provision of an exact group 3 comprising a preset number of cookies within the collecting magazine, the lifting finger 30 will travel through the working section of its path and shift the cooky group 3 away from the wheel until the group occupies the terminating portion 20 of the collecting magazine. Thereupon, the latter will turn toward the conveyor belt 21, while the lifting finger completes its take-away exiting section, withdrawing into the slot 32 in the guide 26, and then the return and entrance sections, thus resuming its starting position.

During rotation of the terminating section 20, the group of cookies contained therein are held back by the guide 26. On completion of the rotational movement, the shells 28 and 29 are opened clamshell fashion and the group 3 of the cookies deposited onto the belt 21.

It should be noted that at the end of said delay time, the rest surface 9 is again lowered, whereby cookie feeding to the wheel is resumed, said cookies being heaped in the initial portion 19 of the collecting magazine 17.

It should be noted that temporary interruption of the inflow of cookies to the wheel allows the lifting finger to move through its working path section without cookies impinging on it which are being urged forward by the paddle 34.

After unloading the group of the cookies onto the conveyor belt, the terminating portion 20 will be returned to its original position, thus completing one period of operation of the device which corresponds to the cookies 2, as cylically picked up from the receiving magazine, being subdivided into a group 3 containing cookies in a preset number.

It should be noted that the number of operating cycles required of the pusher 14 to form the group of cookies may be determined, rather than by the aforesaid stroke counter, by the detector 78 located along the collecting magazine 17. In this case, the group of cookies, instead of containing a preset number of cookies, will have a preset length. It should be noted that the positioning of the detector 78 along the collecting magazine 17 is effected somewhat in advance with respect to the final length of the group, to take into account the last cookies left on the wheel and undelivered to the collecting magazine.

Likewise, the set of operating cycles of the pusher 14 may be determined, rather than by a desired length of the group of cookies, by a desired weight thereof. In this case, a weight detector would determine the number of cycles required. Accordingly, the detector may be positioned to detect the weight of a group just formed and already unloaded from the device 1, and yet provide useful information on a group being formed since, as is known, the weight of the cookies would not change suddenly.

Thus, the operation of the device 1 according to the present invention can be repeated as required for any desired number of periods, each comprising a required number of cycles to form a group having a preset number of cookies, or a preset length, or a preset weight.

It should be noted that when a large number of like devices 1 are flanking a conveyor belt 21, the rest surface 9 of any such device may be moved to its raised position on the situation arising whereby, for a reason whatever, the receiving magazine of that device is being emptied. This will enable refilling of the receiving magazine and prevent the device from operating in an empty state.

Lastly, it should be noted that the angle $\alpha$ between the collecting magazine and the vertical may be selected to be quite small, by virtue of the eave 79 protecting the cookies 2 carried on the wheel 4 against the effects of the weight of overlying cookies stacked in the same magazine.

The device according to the present invention affords the important advantage of enabling cookies to be divided into groups quickly and without damaging them in any way, thanks to the cookies being fed into the collecting magazine from below by the sawtooth wheel and to cookies being fed to the wheel tangentially thereof.

An added advantage of the inventive device resides in its versatility, resulting from its ability to divide cookies into groups of preset weight, or length, of number of cookies.

It is also possible to divide into groups very thin cookies; in that case, at each cycle, the pusher may shift two or more cookies with each stroke.

A further advantage of the device of the present invention is that it lends itself for association with other such devices to form a cluster wherein operation of the individual devices can be controlled as required.

Furthermore, the ability to arrange the collecting magazine at a very small angle from the vertical promotes orderly and compact stacking of the cookies in the magazine itself.

Another advantage of the device according to the present invention is that it allows the wheel to be operated at a high rotational speed without, in any way, damaging the cookies as the wheel moves to the collecting magazine.

Of course, the device described hereinabove may be altered and modified in many ways by the skilled person in the art to meet specific contingent requirements, without departing from the protection scope of the invention as defined in the appended claims.

I claim:

1. A device for dividing flat pastry products, such as cookies and the like, into groups for packaging which comprises
    a sawtooth wheel, each tooth having a back face and a front face, said wheel being rotatable about a horizontal axis,
    a rest surface having teeth extending tangentially to said wheel,
    a tubular cookie-receiving magazine extending vertically above said rest surface and open thereto,
    a pusher acting on said rest surface toward the sawtooth wheel,
    a tubular cookie-collecting magazine extending radially to said wheel and at an angle to said tubular cookie-receiving magazine in the direction of rotation of the sawtooth wheel, said cookie-collecting magazine being open to and fed by said wheel,
    stop means for holding the cookies back at the collecting magazine, and a lifting finger engaged by moving along said collecting magazine to move a group of said cookies away from the wheel,
    said rest surface being cyclically shiftable between a lower position and a raised position where it is in substantial contact with the receiving magazine when a preset number of cookies have been fed to the wheel, and
    means for maintaining the rest surface in said raised position for a predetermined period of time in order to enable the last of the cookies fed to the wheel to reach the cookie-collecting magazine and the lifting finger to shift the group of cookies disposed in said cookie-collecting magazine away from the wheel.

2. The device according to claim 1, wherein a paddle is in operable associated with and movable in substantially perpendicular direction to the direction of the collecting magazine for moving a cookie toward said collecting magazine.

3. The device according to claim 2, wherein the collecting magazine comprises a receiving section and a terminating section which are separable from each other, and means are provided for shifting the terminating section angularly from the receiving section.

4. The device according to claim 1, wherein each tooth on the sawtooth wheel has an eave which extends as a continuation of its back face, cantilever-fashion, over the adjoining tooth.

5. The device of claim 3 wherein the terminating section of the collecting magazine is divided into two opposing half sections and means are provided for opening and closing said half sections on each other.

6. The device of claim 3 wherein a conveyor belt is provided for receiving the group of cookies from the collecting magazine and arcuate guide means are provided for guiding the terminating section to said conveying means.

* * * * *